(12) United States Patent
Kim

(10) Patent No.: US 6,470,404 B1
(45) Date of Patent: Oct. 22, 2002

(54) ASYNCHRONOUS COMMUNICATION DEVICE

(75) Inventor: Gye Su Kim, Taeku-Kwangyokshi (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/389,599

(22) Filed: Sep. 3, 1999

(30) Foreign Application Priority Data

Sep. 10, 1998 (KR) .............................. 98-37406

(51) Int. Cl.[7] .......................... G06F 13/14; G06F 13/36
(52) U.S. Cl. .............................. 710/63; 710/15; 710/18; 710/33; 710/62; 710/106; 710/305
(58) Field of Search .............................. 710/33, 62, 63, 710/15, 18, 305, 106

(56) References Cited

U.S. PATENT DOCUMENTS

| | | | |
|---|---|---|---|
| 4,727,537 A | * | 2/1988 | Nichols ........................ 370/236 |
| 4,823,312 A | | 4/1989 | Michael et al. .............. 364/900 |
| 4,901,348 A | * | 2/1990 | Nichols et al. ........... 340/825.5 |
| 5,164,769 A | * | 11/1992 | Hashimoto et al. ............ 355/46 |
| 5,895,432 A | * | 4/1999 | Zarchy ........................... 701/2 |
| 5,920,708 A | * | 7/1999 | Gates et al. ................. 710/100 |
| 6,101,544 A | * | 8/2000 | Beebe et al. ................ 709/229 |
| 6,192,423 B1 | * | 2/2001 | Graf ............................ 709/217 |
| 6,230,226 B1 | * | 5/2001 | Hu et al. ..................... 710/107 |

* cited by examiner

Primary Examiner—Jeffrey Gaffin
Assistant Examiner—Rehana Perveen
(74) Attorney, Agent, or Firm—Fleshner & Kim, LLP

(57) ABSTRACT

An asynchronous communications element in which two universal asynchronous receiver/transmitter (UART) circuits can commonly use a serial port. The asynchronous communications element according to one embodiment has two UART circuits whose serial port has eight pins, and includes a select control and core interface control block for generating a clock signal for interface between a first UART circuit and a second UART circuit, and a common port control block for controlling the first and second UART circuits to allow the first and second UART circuits to commonly use the serial port.

30 Claims, 6 Drawing Sheets

FIG.5a

| Pin | Signal | Pin | Signal |
|---|---|---|---|
| 1 | D0 | 40 | VCC |
| 2 | D1 | 39 | #RI1/#RI2 |
| 3 | D2 | 38 | #DCD1/#DCD2 |
| 4 | D3 | 37 | #DSR1/#DSR2 |
| 5 | D4 | 36 | #CTS1/#CTS2 |
| 6 | D5 | 35 | MR |
| 7 | D6 | 34 | #OUT11 |
| 8 | D7 | 33 | #DTR1/#DTR2 |
| 9 | RCLK | 32 | #RTS1/#RTS2 |
| 10 | SIN1/SIN2 | 31 | #OUT12 |
| 11 | SOUT1/SOUT2 | 30 | INT1 |
| 12 | OUT21 | 29 | RXRDY1 |
| 13 | OUT22 | 28 | A0 |
| 14 | #CS2 | 27 | A1 |
| 15 | #BAUDOUT | 26 | A2 |
| 16 | XIN | 25 | #ADS |
| 17 | XOUT | 24 | TXRDY1 |
| 18 | #IOR | 23 | TX_CLK |
| 19 | INT2 | 22 | RX_CLK |
| 20 | GND | 21 | #IOW |

ASYNCHRONOUS COMMUNICATION DEVICE

BACKGROUND OF THE INVENTION

1. Field of the Invention

The present invention relates to a communication device, and more particularly, to an asynchronous communication device.

2. Background of the Related Art

Asynchronous communication is a data transmission protocol. FIG. 1 is a schematic block diagram of the prior art asynchronous communications element. The prior art asynchronous communication element is described in detail in U.S. Pat. No. 4,823,312.

Referring to FIG. 1, the prior art asynchronous communications element includes a select and control logic 54 for managing a host interface, a data bus buffer for receiving data of 8 bits, and a baud generator 26 for determining a baud rate. The device further includes a divisor latch (LS) 22, a divisor latch (MS) 24, a modem control register 48 for controlling a modem interface, and a modem status register 46 for indicating the status of the modem. Also included are an interrupt identification (ID) register 44 for indicating the order of interrupt, an interrupt enable register 32 for enabling interrupt, a line status register 34 for indicating the status of a receiver line, and a line control register 20 for determining transmitting and receiving frames.

Next, the prior art device includes a first-in-first out (FIFO) receiver 36 for receiving serial data, a receiver buffer register 28 for storing the serial data, a receiver shift register 38 for converting the received serial data into parallel data, and a receiver timing and controller for generating a clock signal to detect the received serial data. Additionally, the device has a transmitter shift register 40 for converting parallel data into serial data, a transmitter holding register 30 and a FIFO transmitter 42 for storing data to be converted into serial data, and a FIFO control register 52 for setting the environment of FIFO. Finally, a modem control logic 50 controls the modem, and a transmitter timing and controller controls the timing of the transmitter.

The operation of the aforementioned related art asynchronous communications element will now be described. For serial communications, the baud rate is determined in the host, and data are written in the divisor latches (LS, MS) 22 and 24. The baud generator 26 generates a baudout clock using the data written in the divisor latches.

To determine the data format, data are written in the line control register 20 and then a serial frame format is determined. The determined data format is communicated with a remote system through pins "SIN" and "SOUT" of a serial port in response to the baud rate. For communications between the remote system and the data format, the serial port requires eight pins, such as "SIN," "SOUT," "/RTS," "/CTS," "/DTR," "DSR," "/DCD," and "RI."

The prior art asynchronous communications element has various disadvantages. For example, if two UART blocks are separately use the serial port, sixteen pins are required for the two separate serial ports. This increases the cost and occupied area, and makes the circuit unnecessarily complicated.

The above references are incorporated by reference herein where appropriate for appropriate teachings of additional or alternative details, features and/or technical background.

SUMMARY OF THE INVENTION

The present invention substantially obviates one or more of the problems due to limitations and disadvantages of the related art.

An object of the present invention is to allow a plurality of receivers/transmitters to commonly use a serial port.

To achieve at least these advantages in a whole or in parts, there is provided an asynchronous communications element having two universal asynchronous receiver/transmitter (UART) blocks whose serial port has eight pins, includes a select control and core interface control block for generating a receiver clock (RCLK) for interface between a first UART block and a second UART block, and a common port control block for controlling the first and second UART blocks to allow the first and second UART blocks to commonly use the serial port.

In order to achieve at least the above-described objects of the present invention in a whole or in parts, there is provided a communications device including an interface circuit responsive to a clock signal and at least one feed-back control signal, a first receiver/transmitter and a second receiver/transmitter coupled to the interface circuit, the first receiver/transmitter receiving a first clock signal and data from the interface circuit to generate a first baud out signal and the second receiver/transmitter receiving a second clock signal and data from the interface circuit to generate a second baud out signal, a control circuit coupled to the first receiver/transmitter and the second receiver/transmitter and selecting one of the first and second baud out signals as an output clock signal and generating the at least one feed-back control signal for the interface circuit based on data from the first receiver/transmitter and the second receiver/transmitter, wherein the interface circuit generates the first and second clock signals based on the clock signal and the at least one feed-back signal.

To further achieve the above-described objects of the present invention in a whole or in parts, there is provided an asynchronous communications element having two Universal Asynchronous Receiver/Transmitter (UART) circuits including a control circuit, and a select control and core interface control circuit, wherein the control circuit generates a first control signal by comparing data stored in two latches, selects one of the first and second UART circuits in response to the first control signal, generates an output clock signal to control the output of the first and second UART circuits to the serial port, links signals output from the first and second UART circuits respectively with each other in response to the output clock signal, transfers the linked signals to corresponding pins of the serial port, and divides signals input through the serial port to be output to the first and second UART circuits respectively, and wherein the interface circuit generates a first clock signal and a second clock signal required for the first and second UART circuits, respectively, in response to the first control signal and a second control signal of the control circuit, and controls the first and second UART circuits to allow data input through a data bus to be input to the first and second UART circuits in response to the first and second clock signals.

To further achieve the above-described objects of the present invention in a whole or in parts, there is provided a communications device including a plurality of data receiver/transmitter circuits, and a control circuit coupled to the plurality of data receiver/transmitter circuits, wherein the control circuit controls said plurality of data receiver/transmitter circuits and allows the plurality of data receiver/transmitter circuits to send and receive data through a single serial port.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 5a and 5b are schematic views of a preferred embodiment of pin layouts when an asynchronous communications element is used in a package.

DETAILED DESCRIPTION OF PREFERRED EMBODIMENTS

Figure 1:
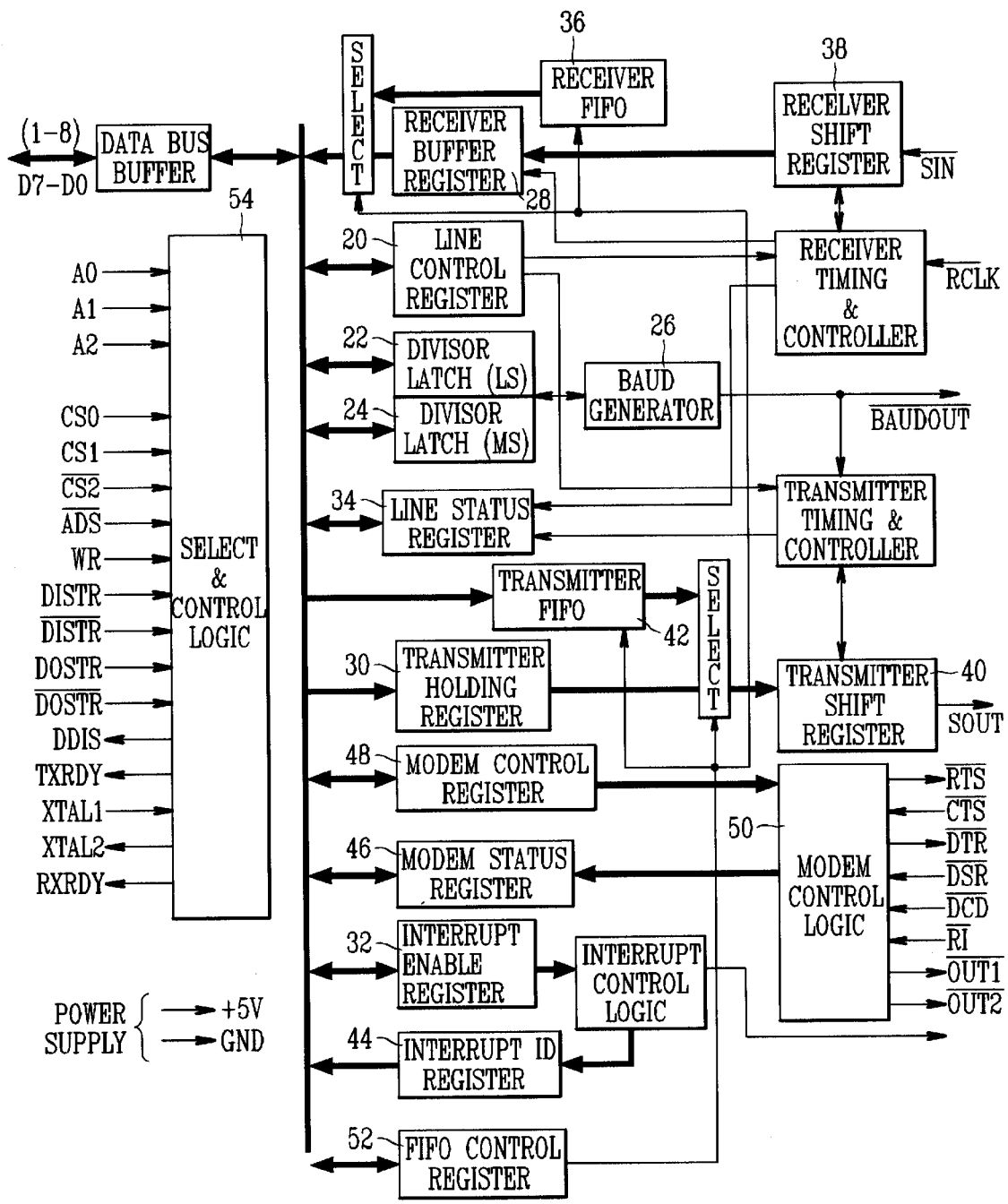
FIG. 1 is a schematic block diagram illustrating a prior art asynchronous communication element.
Figure 2:
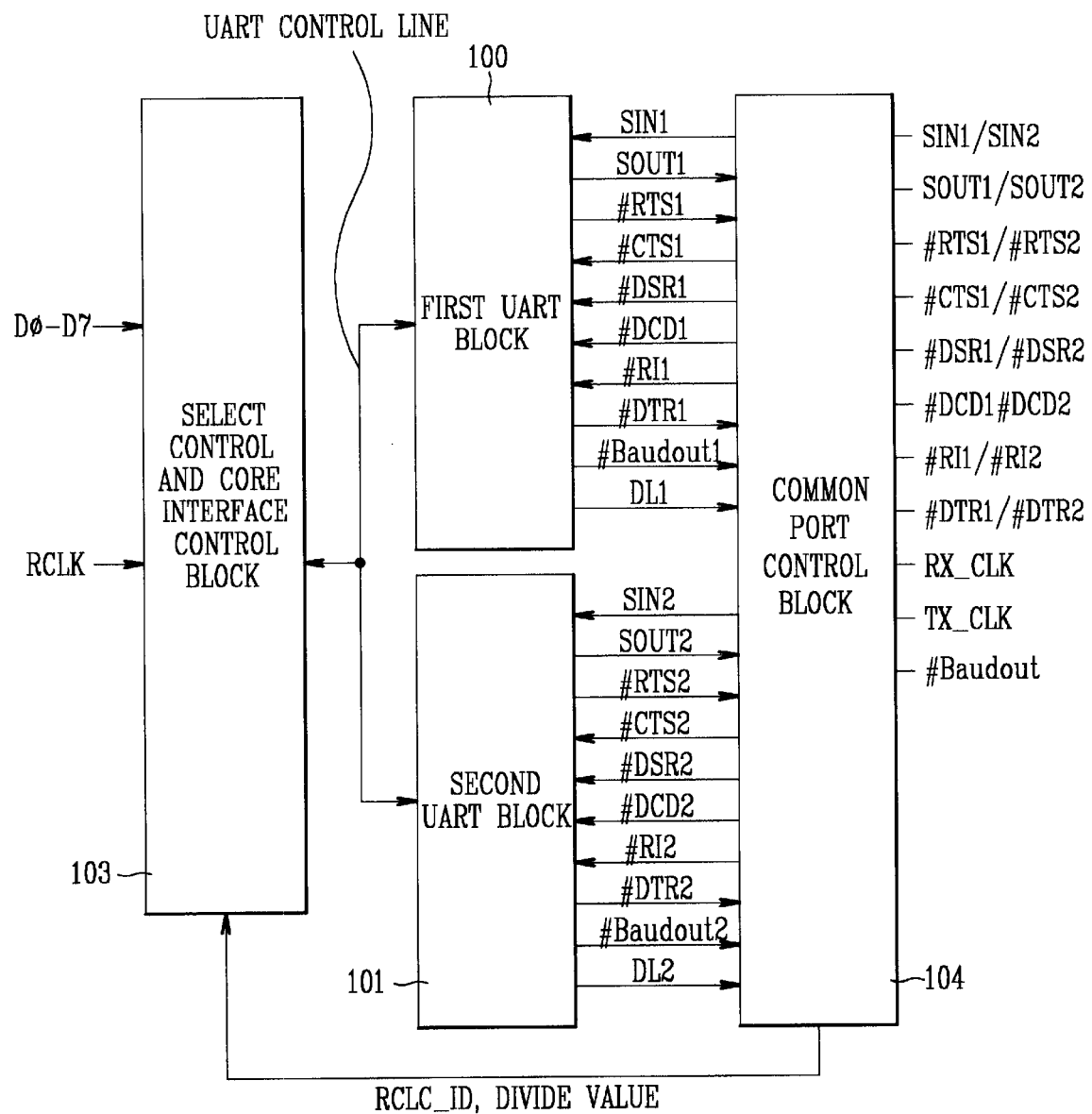
FIG. 2 is a schematic block diagram illustrating an asynchronous communication device according to a preferred embodiment of the present invention.

FIG. 2 is a block diagram of an asynchronous communication element according to a preferred embodiment of the present invention. As shown in FIG. 2, the asynchronous communication element includes first and second UART blocks 100 and 101, a select control and core interface control block 103 to receive a receiver clock signal RCLK for interface between the first UART block 100 and the second UART block 101, and a common port control block 104, which allows the first and second UART blocks 100 and 101 to commonly use a serial port.

The first UART block 100 receives first serial input data SIN1, which is input through the common port control block 104 and outputs first serial output data SOUT1 to the common port control block 104. Thus, the first UART block 100 and the common port control block 104 both transmit and receive signals to and from one another. In addition to the first serial input data SIN1, the first UART block 100 from the common port control block 104 a first clear to send signal $\overline{CTS1}$, a first data set ready signal $\overline{DSR1}$, a first data carrier detect signal $\overline{DCD1}$, and a first ring indicator $\overline{RI1}$. In addition to first serial output SOUT1, signals output from the first UART block 100 to the common port control block 104 are a first request to send $\overline{RTS1}$, a first data terminal ready $\overline{DTR1}$, a first baud out signal $\overline{Baudout1}$, and a first divisor DL1.

Similarly, the second UART block 101 and the common port control block 104 both transmit and receive the same signals. Thus, second serial input data SIN2, a second clear to send signal $\overline{CTS2}$, a second data set ready signal $\overline{DSR2}$ a second data carrier detect signal $\overline{DCD2}$, and a second ring indicator $\overline{RI2}$ are the signals input from the common port control block 104. Similarly, second serial output data SOUT2, a second request to send signal $\overline{RTS2}$, a second data terminal ready signal $\overline{DTR2}$, a second baud out signal $\overline{Baudout2}$, and a second divisor DL2 are the signals output from the second UART block 101 to the common port control block 104.

Figure 3:
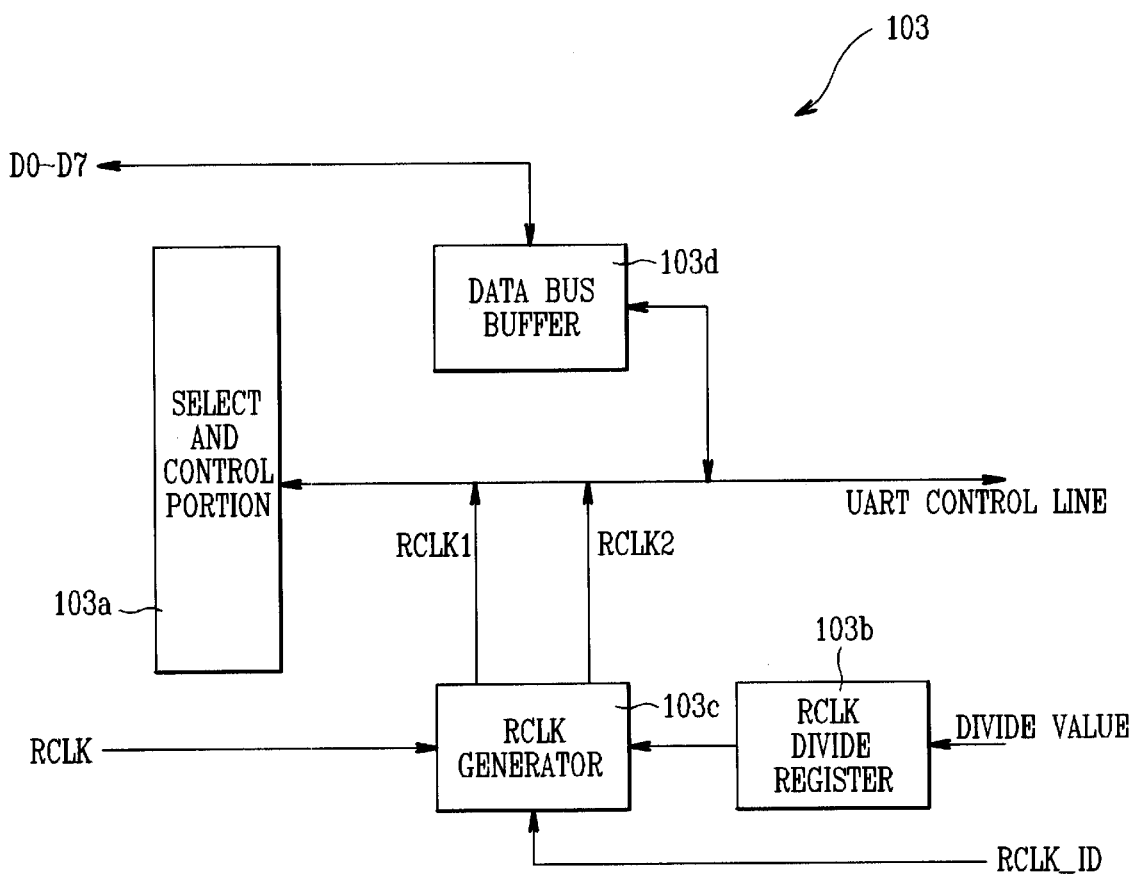
FIG. 3 is a schematic view illustrating a preferred embodiment of a select control and core interface control block of FIG. 2.

FIG. 3 is a block diagram of the select control and core interface control block 103 according to a preferred embodiment of the present invention. As shown in FIG. 3, the select control and core interface control block 103 includes a select and control portion 103, and a receiver clock divide register RCLK Divide Register 103b. Additionally, a receiver clock generator RCLK Generator 103c outputs a first receiver clock signal RCLK1 to the first UART block 100 and outputs a second receiver clock signal RCLK2 to the second UART block 101, and a data bus buffer 103d transfers data input through a data bus to the first UART block 100 or the second UART block 101.

Figure 4:
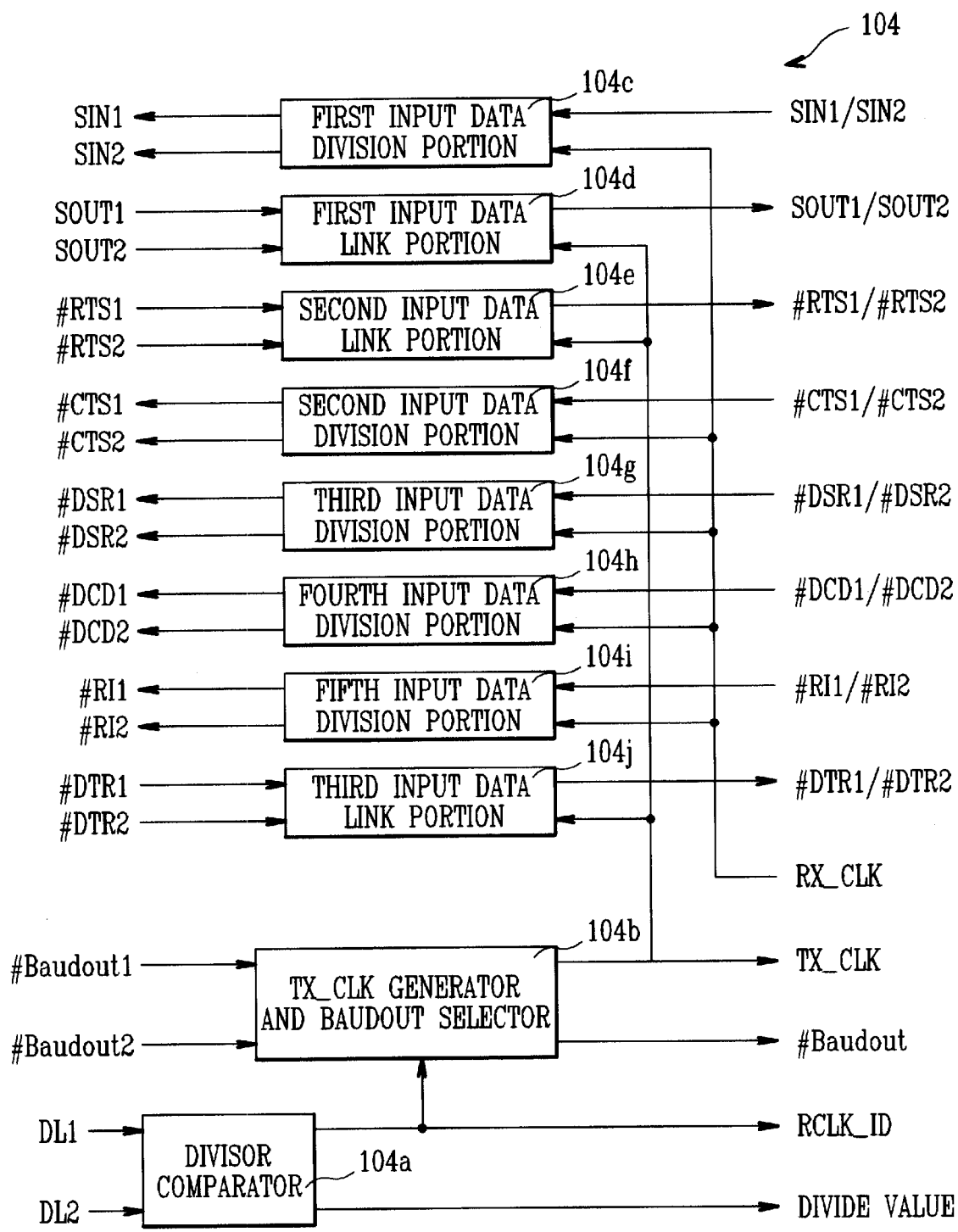
FIG. 4 is a schematic view illustrating a preferred embodiment of a common port control block of FIG. 2.

As shown in FIG. 4, the common port control block 104 includes a divisor comparator 104a for comparing data stored in a first divisor latch DL1 of the first UART block 100 with data stored in a second divisor latch DL2 of the second UART block 200, and a transmitter clock generator and Baudout selector 104b for selecting one of the signals $\overline{Baudout1}$ and $\overline{Baudout2}$ output from the first UART block 100 and the second UART block 101, and for generating a transmitter clock signal TX_CLK. Next, a first input data division portion 104c divides data input through pin SIN1/SIN2 of the serial port into a first serial input SIN1, which will be input to the first UART block 100, and a second serial input SIN2, which will be input to the second UART block 101. Furthermore, a first output data link portion 104d links the first serial output SOUT1 and the second serial output SOUT2, respectively output from the first and second UART blocks 100 and 101, with each other and transfers the linked signals to pin SOUT1/SOUT2 of the serial port. A second output data link portion 104e links the first and second request to send signals $\overline{RTS1}$ and $\overline{RTS2}$, respectively output from the first and second UART blocks 100 and 101, with each other and transfers the signals to pin $\overline{RTS1}/\overline{RTS2}$ of the serial port.

Next, a second input data division portion 104f divides signals transferred through pin $\overline{CTS1}/\overline{CTS2}$ of the serial port into a first clear to send signal $\overline{CTS1}$, which is transferred to the first UART block 100, and a second clear to send signal $\overline{CTS2}$, which is transferred to the second UART block 101. A third input data division portion 104g divides signals transferred through pin $\overline{DSR1}/\overline{DSR2}$ of the serial port into a first data set ready signal $\overline{DSR1}$, which is transferred to the first UART block 100, and a second data set ready signal $\overline{DSR2}$, which is transferred to the second UART block 101.

In addition, a fourth input data division portion 104h divides signals transferred through pin $\overline{DCD1}/\overline{DCD2}$ of the serial port into a first data carrier data detect signal $\overline{DCD1}$, which is transferred to the first UART block 100, and a second data carrier detect signal $\overline{DCD2}$, which is transferred to the second UART block 101. A fifth input data division portion 104i divides signals transferred through pin $\overline{RI1}/\overline{RI2}$ of the serial port into a first ring indicator $\overline{RI1}$, which is transferred to the first UART block 100, and a second ring indicator $\overline{RI2}$, which is transferred to the second UART block 101. Finally, a third output data link portion 104j links the signals $\overline{DTR1}$ and $\overline{DTR2}$, transferred from the first and second UART blocks 100 and 101, respectively, with each other and transfers the linked signal to pin $\overline{DTR1}/\overline{DTR2}$ of the serial port in response to the transmitter clock signal TX_CLK.

Each of the output data link portions 104d, 104e, and 104j operates in response to the transmitter clock signal TX_CLK output from the TX_CLK generator and Baudout selector 104b. Each of the input data division portions 104c, 104f, 104g, 104h, and 104i operates in response to the receiver clock signal RX_CLK transferred through pin RX_CLK of the serial port.

Figure 5B:
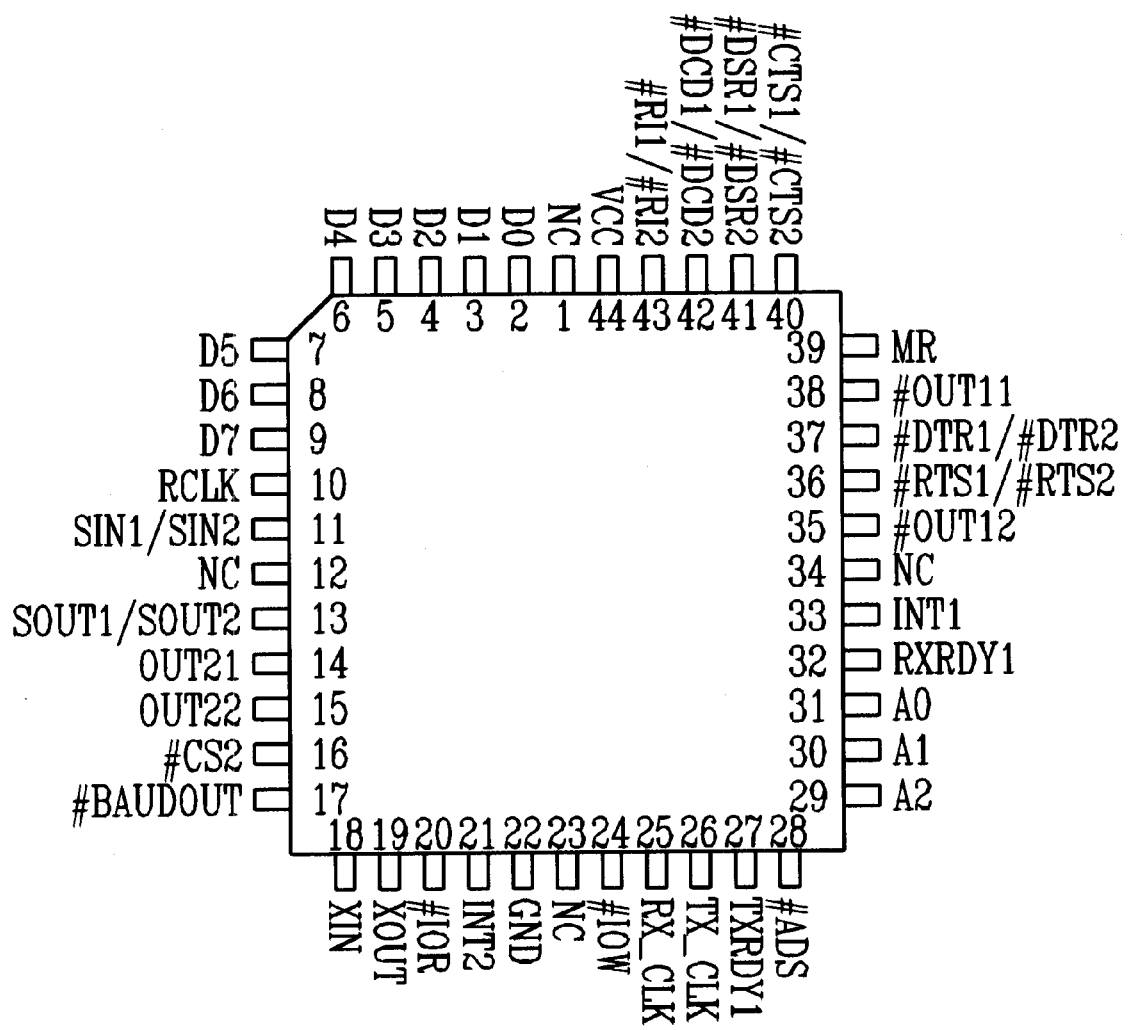

The pin configuration of an asynchronous communications device according to a preferred embodiment and as used in a package will be described with reference to FIGS. 5a and 5b. FIG. 5a shows the configuration for the asynchronous communications element as applied to a 40 pin DIP type package. FIG. 5b shows the configuration for the asynchronous communications element as used in a 44 pin PLCC type package.

As shown in FIGS. 5a and 5b, pins D0-D7 comprise an 8-bit data bus capable of transmitting and receiving data. The receiver clock signal RCLK, which is a receiver baud rate clock, is applied to one of the first UART block 100 and the second UART block 101, depending on which one has the faster baud rate. Pins SIN1/SIN2 are serial data input pins for providing input signals to the first and second UART blocks 100 and 101, while SOUT1/SOUT2 are serial data output pins for providing output signals from the first and second UART blocks 100 and 101.

Pin OUT21 is a pin corresponding to the first output 1 of the second UART block 101, and pin OUT22 is a pin corresponding to the second output 2 of the second UART block 101. Both pin OUT21 and pin OUT22 are modem control signal output pins.

Pin $\overline{CS2}$ is a chip select pin and is activated by a low signal. Pin $\overline{BAUDOUT}$ receives an output from one of the first and second UART blocks 100 and 101, depending on which one has the faster baud rate. Pin XIN is a source clock input pin, and pin XOUT is a source clock output pin. Pin $\overline{IOR}$ is an input/output read signal pin used when data is read in inner registers of the first and second UART blocks 100 and 101, and is activated by a low signal.

Pin INT2 is for an interrupt signal of the second UART block 101 and pin GND is a ground pin. Pin $\overline{IOW}$ is an input/output write signal pin and is activated by a low signal. Pin $\overline{IOW}$ is used when data is written in inner registers of the first and second UART blocks 100 and 101.

Pin RX_CLK receives a receiver clock signal for input to the serial port, and is transferred to the first UART block 100 at its rising edge and transferred to the second UART block 101 at its falling edge. Pin TX_CLK receives a transmitter clock signal for the output of the serial port.

Additionally, pin TXRDY1 corresponds to a first transmitter ready signal TXRDY of the first UART block 100, while pin RXRDY1 corresponds to a first receiver ready signal RXRDY of the first UART block 100. Pin $\overline{ADS}$ receives an address strobe signal, which is used for exact effective addresses. Pins A0-A2 receive 3-bit addresses for selecting inner registers of the first and second UART blocks 100 and 101. Pin INT1 receives an interrupt signal of the first UART block 100.

Pin $\overline{OUT12}$ is a pin corresponding to the second output signal $\overline{OUT2}$ of the first UART block 100, and pin $\overline{OUT11}$ is a pin corresponding to the first output signal $\overline{OUT1}$ of the first UART block 100. Pins $\overline{RTS1}$ and $\overline{RST2}$ are pins corresponding to the first and second request to send signals $\overline{RST1}$ and $\overline{RST2}$ of the first and second UART blocks 100 and 101.

Pins $\overline{DTR1}$ and $\overline{DTR2}$ are pins corresponding to the first and second data terminal ready signals $\overline{DTR1}$ and $\overline{DTR2}$ of the first and second UART blocks 100 and 101. These signals $\overline{DTR1}$ and $\overline{DTR2}$ serve to inform the modem or the remote system that the first and second UART blocks 100 and 101 are ready for communications. Pin MR receives a master reset signal, and pins $\overline{CST1}$ and $\overline{CST2}$ are pins corresponding to the first and second clear to send signals $\overline{CST1}$ and $\overline{CST2}$ of the first and second UART blocks 100 and 101.

Pins $\overline{DSR1}$ and $\overline{DSR2}$ are pins corresponding to the first and second data set ready signals $\overline{DSR1}$ and $\overline{DSR2}$ of the first and second UART blocks 100 and 101, and serve to inform the first and second UART blocks 100 and 101 that the modem or the remote system is ready to communicate with the first and second UART blocks 100 and 101.

Pins $\overline{DCD1}$ and $\overline{DCD2}$ are pins corresponding to the first and second data carrier detect signal $\overline{DCD1}$ and $\overline{DCD2}$ of the first and second UART blocks 100 and 101, and serve to inform the first and second UART blocks 100 and 101 that data should be detected from the modem or the remote system.

Pins $\overline{RI1}$ and $\overline{RI2}$ are pins corresponding to the first and second ring indicator $\overline{RI1}$ and $\overline{RI2}$ of the first and second UART blocks 100 and 101, and serve to inform the first and second UART blocks 100 and 101, that a telephone ring signal has been detected from the modem or the remote system. Finally, pin Vcc receives a power source of 5V.

The operation of the asynchronous communications element according to a preferred embodiment of the present invention will now be described. To set the baud rate of the first and second UART blocks 100 and 101, the host writes suitable data in the first and second divisor latches DL1 and DL2 (not shown) of the first and second UART blocks 100 and 101. Accordingly, the first UART block 100 outputs the first baud out signal $\overline{BAUDOUT1}$, while the second UART block 101 outputs the second baud out signal $\overline{BAUDOUT2}$.

Meanwhile, the divisor comparator 104a in the common port control block 104 compares the values of the first and second divisor latches DL1 and DL2 of the first and second UART blocks 100 and 101 and then generates a receiver clock ID signal RCLK_ID.

The receiver clock ID signal RCLK_ID is input to the TX_CLK generator and Baudout selector 104b in the common port control block 104, and is simultaneously input to the RCLK generator 103c of the select control and core interface control block 103. Thus, the TX_CLK generator and Baudout selector 104b selects one of the first and second baud out signals $\overline{BAUDOUT1}$ and $\overline{BAUDOUT2}$ in response to the receiver clock ID signal RCLK_ID input from the divisor comparator 104a, and outputs the selected one to the serial port.

The divided value of DL1 and DL2 is then stored in the receiver clock divide register RCLK Divide Register 103b of the select control and core interface control block 103. The TX_CLK generator and Baudout selector 104b generates the transmitter clock signal TX_CLK using the selected Baudout signal.

Each of the output data link portions 104d, 104e, and 10j of the common port control block 104 samples the modem control signal SOUT1 and SOUT2 from the first and second UART blocks 100 and 101 one time at each of the rising edge and falling edge one time using the generated transmitter clock signal TX_CLK, and outputs the sampled value to the serial port. The receiver clock signal RX_CLK in the common port control block, shown in FIG. 4, is a clock signal having a rising edge and falling edge at least one or more times for a 1 bit time period of any one having faster baud rate than that of the first and second UART blocks 100 and 101.

Each of the input data division portions 104c, 104f, 104g, 104h, and 104i of the common port control block 104 samples the modem control signals SIN1 and SIN2 from the modem or the other external devices at the rising edge and falling edge one time using the receiver clock signal RX_CLK and then outputs the sampled value to the first and second UART blocks 100 and 101.

Meanwhile, the receiver clock generator RCLK Generator 103c of the select control and core interface control block 103 divides the receiver clock signal RCLK into the value stored in the RCLK divide register 103b. If the receiver clock ID RCLK_ID input from the divisor comparator 104a is high, the input receiver clock signal RCLK is set to the second receiver clock signal RCLK2, and the input receiver clock signal RCLK divided by the value stored in the RCLK divide register 103b is set to the first receiver clock signal RCLK1. Then, the signals RCLK2 and RCLK1 are transferred to the second UART block 101 and the first UART block 100, respectively. On the contrary, if the receiver clock ID RCLK_ID input from the divisor comparator 104a is low, the input receiver clock signal RCLK is set to the first receiver clock signal RCLK1, and the input receiver clock signal RCLK divided by the value stored in the RCLK divide register 103b is set to the second receiver clock signal RCLK2. Then, the signals RCLK1 and RCLK2 are transferred to the first UART block 100 and the second UART block 101, respectively.

As stated above, the asynchronous communication device of the present invention has an advantage that the two UART blocks commonly use one serial port without separate ports.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A communications device, comprising:
    an interface circuit responsive to a clock signal and at least one feed-back control signal;
    a first receiver/transmitter and a second receiver/transmitter coupled to said interface circuit, said first receiver/transmitter receiving a first clock signal and data from said interface circuit to generate a first baud out signal and said second receiver/transmitter receiving a second clock signal and data from said interface circuit to generate a second baud out signal;
    a control circuit coupled to said first receiver/transmitter and said second receiver/transmitter and selecting one of said first and second baud out signals as an output clock signal and generating said at least one feed-back control signal for said interface circuit based on data from said first receiver/transmitter and said second receiver/transmitter, wherein said interface circuit generates the first and second clock signals based on the clock signal and said at least one feed-back signal.

2. The device of claim 1, wherein said interface circuit comprises:
    a data bus buffer to receive and store data;
    a clock signal generator which receives the clock signal and the at least one control signal and a second control signal to generate the first and second clock signal;
    a receiver clock divide register which receives a divide signal from said control circuit and provides the second control signal to the clock signal generator; and
    a selector to control the data and the first and second clock signal on a receiver/transmitter control line.

3. The device of claim 1, wherein said control circuit comprises:
    a divisor comparator which receives divisor data from said first and second receiver/transmitters and generates said at least one feed-back control signal;
    a signal generator and selector which receives the first and second baud out signals from said first and second receivers/transmitters and generates a transmitter clock signal and a baudout signal;
    an input data divider which receives external data and divides it into a first and second input data;
    an output data link which receives output data from said first and second receivers/transmitters and combines the data into a single data.

4. The device of claim 3, wherein the output data link comprises:
    a first output data link circuit which receives a first and second serial output data and generates a combined serial output data;
    a second output data link circuit which receives a first and second request to send signal and generates a combined request to send signal; and
    a third output data link circuit which receives a first and second data terminal ready signal and generates a combined data terminal ready signal.

5. The device of claim 3, wherein the input data divider comprises:
    a first input data divider circuit which receives a serial input signal and divides it into a first and second serial input signal;
    a second input data divider circuit which receives a clear to send signal and divides it into a first and second clear to send signal;
    a third input data divider circuit which receives a data set ready signal and divides it into a first and second data set ready signal;
    a fourth input data divider circuit which receives a data carrier detect and divides it into a first and second data carrier detect signal; and
    a fifth input data divider circuit which receives a ring indicator signal and divides it into a first and second ring indicator signal.

6. The device of claim 3, wherein said signal generator and selector further receives said at least one feed-back control signal as an input.

7. The device of claim 3, wherein said at least one feed-back control signal comprises a receiver clock identification signal and a divide value signal.

8. The device of claim 7, wherein said signal generator and selector further receives the receiver clock identification signal as an input.

9. The device of claim 1, wherein said interface circuit further receives a data signal, and wherein the data signal is transferred to each of said first and second receivers/transmitters.

10. The device of claim 1, wherein the first receiver/transmitter further generates a first serial data output signal, a first ready to send signal, a first data terminal ready signal, and a first divisor latch signal, and the second receiver/transmitter further generates a second serial data output signal, a second ready to send signal, a second data terminal ready signal, and a second divisor latch signal.

11. The device of claim 1, wherein the first receiver/transmitter receives from the control circuit a first serial input, a first clear to send signal, a first data set ready signal, a first data carrier detect signal, and a first ring indicator signal, and the second receiver/transmitter receives from the control circuit a second serial input, a second clear to send signal, a second data set ready signal, a second data carrier detect signal, and a second ring indicator signal.

12. The device of claim 10, wherein the control circuit further outputs an output clock signal, and one of the first and second serial data output signal, one of the first and second ready to send signal, and one of the first data terminal ready signal.

13. The device of claim 11, wherein the control circuit further receives an input clock signal, a serial input, a clear to send signal, a data set ready signal, a data carrier detect signal, and a ring indicator signal.

14. An asynchronous communications element having two Universal Asynchronous Receiver/Transmitter (UART) circuits, comprising:
   a control circuit; and
   a select control and core interface control circuit, wherein said control circuit generates a first control signal by comparing data stored in two latches, selects one of the first and second UART circuits in response to the first control signal, generates an output clock signal to control the output of the first and second UART circuits to a serial port, links signals output from the first and second UART circuits respectively with each other in response to the output clock signal, transfers the linked signals to corresponding pins of the serial port, and divides signals input through the serial port to be output to the first and second UART circuits respectively, and wherein said select control and core interface control circuit generates a first clock signal and a second clock signal required for the first and second UART circuits, respectively, in response to the first control signal and a second control signal of the control circuit, and controls the first and second UART circuits to allow data input through a data bus to be input to the first and second UART circuits in response to the first and second clock signals.

15. The device of claim 14, wherein the output clock signal has at least one or more rising edges and falling edges for a 1 bit time period of the first and second UART circuits.

16. The device of claim 14, wherein the control circuit comprises:
   a divisor comparator which compares data stored in a first divisor latch of the first UART circuit with data stored in a second divisor latch of the second UART circuit, and which outputs a master control signal to control the interface circuit;
   a signal generator and baud rate selector which selects one of a first baud rate and a second baud rate output from the first and second UART circuits respectively, and generates the output lock signal;
   first, second, third, fourth, and fifth input data division circuits which divide data input through pins of the serial port into the first UART circuit and the second UART circuit; and
   first, second, and third output data link circuits which output signals from the first and second UART circuits, respectively, to corresponding pins of the serial port.

17. The device of claim 16, wherein the first output data link circuit links first signals respectively output from the first and second UART circuits with each other and outputs them to a first pin of the serial port, the second output data link circuit links second signals respectively output from the first and second UART circuits with each other and outputs them to a second pin of the serial port, and the third output data link circuits links third signals respectively output from the first and second UART circuits with each other and outputs them to a third pin of the serial port.

18. The device of claim 14, wherein the interface circuit comprises:
   an clock signal divide register to store the second control signal of the control circuit;
   a clock signal generator to receive the first control signal of the control circuit, an output of the clock signal divide register, and the external clock signal to generate the first and second clock signals to output to the first and second UART circuits, respectively;
   a data bus buffer to temporarily store data input through a data bus and output the data to the first and second UART circuits; and
   a select and control circuit to control timing of transfer of the first and second clocks signals and data output from the data bus buffer to the first and second UART circuits.

19. The device of claim 15, wherein each of the output data link circuit samples a modem control signal from each of the first and second UART circuits at the rising edge and falling edge one time using the output clock signal and outputs the sampled value to corresponding pins of the serial port.

20. A communications device, comprising:
   a plurality of data receiver/transmitter circuits; and
   first and second control circuits coupled to each of said plurality of data receiver/transmitter circuits, wherein said first control circuit receives an external clock signal and selects one of the plurality of data receiver/transmitter circuits to send and receive data, and wherein said second control circuit provides an interface between each of said plurality of data transmitter/receiver circuits and a signal serial port, and wherein the plurality of data receiver/transmitter circuits selectively send and receive data through the single serial port according to the selection of the first control circuit.

21. The device of claim 20, wherein said first control circuit comprises
   a select control and core interface circuit coupled to receive the external clock signal and at least one feed-back control signal from the second control circuit; and
   wherein the second control circuit comprises a common port control circuit coupled to receive an output of said plurality of data receiver/transmitter circuits, wherein said select control and core interface circuit controls which of said plurality of data receiver/transmitter circuits communicates with said common port control circuit at a prescribed time.

22. The device of claim 21, wherein the feed-back control signal comprises a first control signal and a second control signal.

23. The device of claim 22, wherein said select control and core interface circuit comprises:
   a divide register which receives a first control signal;
   a clock signal generator which receives a second control signal, an external clock signal, and an output of the divide register, and generates a plurality of clock signals;
   a data bus buffer which receives and temporarily stores data from a data bus; and
   a select and control circuit which controls the timing and transfer of the plurality of clock signals and the data from said data bus buffer to said plurality of receiver/transmitter circuits.

24. The device of claim 23, wherein said common port control circuit comprises:
   a divisor comparator which receives data from a plurality of data latches and generates the master control signal;

a signal generator and selector which receives a baud signal from each of said plurality of receiver/transmitter circuits and generates an output clock signal and a baudout signal;

an input data divider which receives and divides serial data from the serial ports; and an output data link which receives receiver/transmitter data from said plurality of receiver/transmitter circuits and outputs the receiver/transmitter data to the serial port.

25. The device of claim 24, wherein the master control signal comprises first and second control signals, said input data divider comprises a plurality of input data division portions, and said output data link comprises a plurality of output data link portions.

26. The device of claim 25, wherein each of said plurality of input data division portions and output data link portions contacts different ones of a plurality of pins of the serial port, each of said plurality of input data division portions receives an input clock signal, and each of said plurality of output data link portions receives the output clock signal.

27. The device of claim 26, wherein said signal generator and selector receives the second control signal.

28. The device of claim 1, wherein one of the first and second receivers/transmitters is selected by the common circuit control circuit, and wherein the baud rate of the selected receiver/transmitter is faster than the baud rate of the non-selected UART circuit.

29. The device of claim 3, wherein the signal generator and baud rate selector selects a faster of the first baud rate and second baud rate.

30. The device of claim 16, wherein the first input data division circuit divides a first signal input to the serial port into first and second serial input signals and outputs first and second UART input signals to the first and second UART circuits respectively, the second input data division circuit divides a second signal input to the serial port into third and fourth UART input signals and outputs them to the first and second UART circuits respectively, the third input data division circuit divides a third signal input to the serial port into fifth and sixth UART input signals and outputs them to the first and second UART circuits respectively, the fourth input data division circuit divides a fourth signal input to the serial port into seventh and eighth UART input signals and outputs them to the first and second UART circuits respectively, and the fifth input data division circuit divides a fifth signal input to the serial port into ninth and tenth UART input signals and outputs them to the first and second UART circuits respectively.

* * * * *